United States Patent [19]

Farcy et al.

[11] 4,069,458
[45] Jan. 17, 1978

[54] POWER LASER CHAIN

[75] Inventors: Jean-Claude Farcy, Briis sur Forges; Genevieve Girard, Jouy en Josas; Maurice Michon, Draveil, all of France

[73] Assignee: Compagnie General d'Electricite, Paris Cedex, France

[21] Appl. No.: 636,497

[22] Filed: Dec. 1, 1975

[30] Foreign Application Priority Data

Jan. 15, 1975 France .................................. 75.01173

[51] Int. Cl.² ............................................. H01S 3/10
[52] U.S. Cl. .............................. 330/4.3; 331/94.5 T; 350/157; 350/276 SL
[58] Field of Search ...................... 330/4.3; 332/7, 51; 350/156, 157, 159, 276 SL; 356/119; 331/94.5 C, 94.5 T

[56] References Cited

U.S. PATENT DOCUMENTS

| 3,060,808 | 10/1962 | Korster | 350/157 |
| 3,191,493 | 6/1965 | Mainardi et al. | 350/157 |
| 3,401,590 | 9/1968 | Massey | 350/157 |
| 3,407,364 | 10/1968 | Turner | 330/4.3 |
| 3,523,718 | 8/1970 | Crow | 331/94.5 C |
| 3,584,312 | 6/1971 | Statz | 331/94.5 T |

FOREIGN PATENT DOCUMENTS 1,585,293  1/1970  France ................................ 332/7.51

OTHER PUBLICATIONS

Boquillar, "Disposity Anti-Retour Pour Laser A Rubis", 1975, pp. 339–343, Nouv. Rev. Optique, No. 6.

Primary Examiner—Nelson Moskowitz
Attorney, Agent, or Firm—Sughrue, Rothwell, Mion, Zinn and Macpeak

[57] ABSTRACT

Power laser chain. Two amplifying elements are separated by a linear polarizer placed between two polarization transformers such as a quarter wave plate or a Fresnel parallelepiped, this preventing auto-oscillators in the amplifying chain, it being possible to repeat that sequence several times in the chain.

3 Claims, 4 Drawing Figures

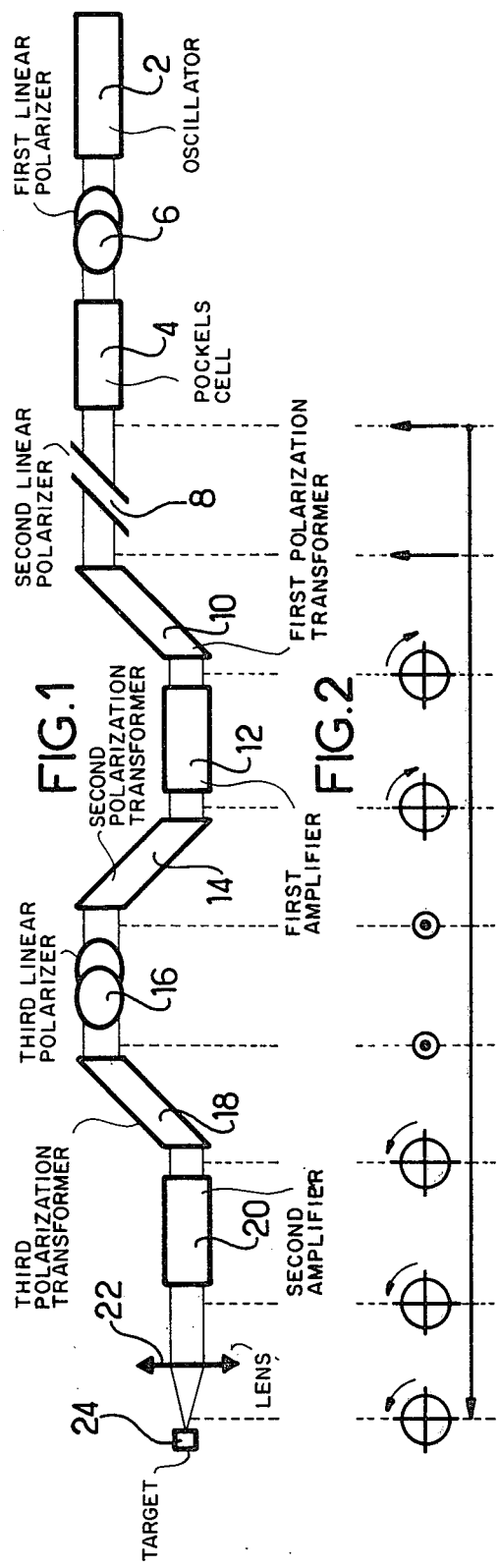

POWER LASER CHAIN

BACKGROUND OF THE INVENTION

1. Field of the Invention

The present invention concerns a power laser chain, for example of the carbon dioxide type, for providing infra-red light pulses having a wavelength of 10.6 microns.

2. Description of the Prior Art

Such a chain conventionally comprises the following elements arranged in series, following the path of the light beam:

- a laser oscillator for forming the beam into pulses;
- a modulator for shortening the pulses, that modulator comprising, at its output, a linear polarizer;
- a quarter wave plate suitably arranged fo transforming the linear polarization of the pulses into circular polarization;
- one or several laser amplifying elements for amplifying the light pulses which can subsequently be focussed on a target.

The function of the quarter wave plate is to protect the modulator from return pulses, which result from the retrodiffusion or reflecting of a part of the light received by the target. Indeed, the pulses transmitted by that plate towards the target through the amplifying elements are polarized circularly and the same is therefore the case with the pulses retrodiffused by the latter. After having been re-amplified by the elements, these retrodiffused pulses cross through the same quarter wave plate again in the opposite direction (return direction), this transforming their circular polarization into rectilinear polarization, with a polarization direction perpendicular to that which they had on the outgoing trajectory (go direction), at the output of the modulator. The linear polarizer therefore stops them, this ensuring the protection of the modulator.

Such a chain is, for example, described in French patent No. 1 585 293, for a "Non-return device for firing at a target by a laser," in the name of Commissariat a l'Energie Atomique. It has a disadvantage when the energy of the pulses supplied is required to be increased by increasing the gain of the amplifier elements: if that gain exceeds a critical value, of 60 dB, for example, the inevitable presence of spurious reflecting or retrodiffusing surfaces at both ends of the amplifying chain causes the appearing of spontaneous laser oscillations which can be a great hindrance.

The aim of the present invention is to produce a power laser chain having an increased gain without any danger of the appearing of spontaneous oscillations.

SUMMARY OF THE INVENTION

It has as its object a power laser chain comprising, in series on the path of a light beam:

- a laser oscillator forming the said beam;
- a first linear polarizer;
- a first transformer of the type transforming a linear polarization into a circular polarization and vice-versa;
- and a laser amplifying chain, characterized in that said amplifying chain is divided into a first and a second amplifying element and comprises, moreover, in series on the path of the said beam and between those two amplifying elements:
- a second transformer of the said type;
- a second linear polarizer crossed with the first;
- and a third transformer of the said type.

By means of the accompanying diagrammatic FIGS. 1 to 4, an embodiment of the invention having no limiting character will be described herebelow.

BRIEF DESCRIPTION OF THE DRAWINGS

FIG. 1 is a diagrammatic view of a carbon dioxide power laser chain according to the invention.

FIGS. 2, 3 and 4 represent variations in the polarization of the light at various points of that chain.

DESCRIPTION OF THE PREFERRED EMBODIMENT

According to FIG. 1, an oscillator 2 supplies pulses having an energy of 300 mJ and lasting about 35 ns which cross a modulator constituted by a Pockels cell 4 between two crossed polarizers 6 and 8. The latter supplies pulses having an energy of 10 mJ and lasting 1.5 ns, polarized linearly, vertically, for example. These pulses then cross a Fresnel parallelepiped 10 made of sodium chloride, which polarizes them circularly, then a first amplifying element 12, having a gain of 40 dB, then a second Fresnel parallelepiped 14 which polarizes them linearly and horizontally, then a polarizer 16 crossed with the polarizer 8, then a third Fresnel parallelepiped 18, which polarizes them circularly, then a second amplifying element 20 having a gain of 40 dB and lastly, a lens 22 which focusses them on a target 24. Despite the total gain of 80 dB in the amplifying system 12–20, no spurious oscillation can appear.

This can easily be understood by means of FIGS. 2, 3 and 4, on which the long horizontal arrows show the path and the direction of propagation of the light pulses, the vertical arrows represent a vertical linear polarization, the small circles with a dot in the centre represent a horizontal linear polarization and the large circles with two perpendicular diameters represent a circular polarization, a curved arrow showing the direction of rotation of the electric field of the light.

These figures only illustrate the following principles: the crossing of a Fresnel parallelepiped transforms a circular polarization into a rectilinear polarization and vice-versa. The crossing of two Fresnel parallelepipeds in series transforms a vertical linear polarization into a horizontal linear polarization and reverses the direction of rotation of a circular polarization. A suitably arranged quarter wave plate would effect the same transformations.

FIG. 2 illustrates the evolution of a pulse going in the "forward" direction, that is, from the cell 4 to the target 24. FIG. 3 illustrates the evolution of a pulse retrodiffused by the target 24 and therefore going in the "reverse" direction.

The retrodiffusion having maintained more or less the direction of rotation of its circular polarization, it is polarized vertically after the crossing of the parallelepiped 18 and is therefore stopped by the polarizer 16, at least for its greater part, this ensuring a certain non-return protection.

FIG. 4 shows the evolution of a light pulse originating in the amplifying element 20, propagating in the reverse direction and crossing the polarizer 16 which polarizes it. That pulse then crosses the parallelepiped 14, the amplifying element 12 and the parallelepiped 10, then it is again vertically polarized. If it is then reflected by the face of the parallelepiped 10 on the same side as the oscillator 2, it will propagate in the forward direction in the conditions already set forth with reference to FIG. 2, will be reflected on the target 24 and will be stopped, as already set forth with reference to FIG. 3 by the polarizer 16. The result of this, in the arrangement illustrated, is that it will be possible for the gain of each of the amplifying elements 12 and 20 to be amplified only 5 times and that no auto-oscillations will therefore occur.

Nevertheless, the case of a pulse originating in the same conditions as those described with reference to FIG. 4, but being reflected for the first time sooner, that is, upon its emerging from the amplifying element 12, should also be considered. That pulse then crosses that element again, then crosses the parallelepiped 14, at whose output it is polarized vertically. It is therefore stopped by the polarizer 16, after having been amplified only three times.

In a general way, it is apparent that the presence of the polarizer 16 between two Fresnel parallelepipeds inserted in a gap of the amplifying chain prevents the amplifying elements thus separated from co-operating in the producing of spurious oscillations. It is thus possible to increase the gain of that chain by increasing the number of amplifying elements, while avoiding the danger of auto-oscillatin and, to a certain extent, of return pulses, provided that the amplifying elements be separated from one another by one of the linear polarizers such as 16 placed between two polarization transformers such as 14 and 18.

The number of amplifying elements thus separated can be made as great as required, provided the gain of each of them remains less than the auto-oscillation threshold and that the overall gain does not cause any super-radiance phenomenon.

We claim:

1. In a laser chain including means for generating a circularly polarized laser beam and a plurality of amplifier elements on the path of the laser beam for passage of said laser beam therethrough, the improvement comprising:
   means for optically isolating successive amplifier elements,
   said optically isolating means comprising in series on the path of the laser beam and between said amplifier elements, a linear polarizer between two passive transformers of the type transforming a linear polarization into a circular one and vice versa.

2. The laser chain according to claim 1, further comprising a modular situated between said oscillator and said first transformer, said modulator comprising, in series:
   a third linear polarizer crossed with said first polarizer; and
   a Pockels cell intermediate said first and third polarizer.

3. The laser chain as claimed in claim 1 for operating at a wave length of between 9 and 12 microns and wherein said transformers comprise Fresnel parallelepipeds formed of one material of the group consisting of sodium chloride and potassium bromide.

* * * * *